(12) United States Patent
Torres et al.

(10) Patent No.: US 11,607,991 B2
(45) Date of Patent: Mar. 21, 2023

(54) SCHOOL BUS STOP SIGN ASSEMBLY (71) Applicants: Jose Torres, Houston, TX (US); Jose Torres, Jr., Houston, TX (US)

(72) Inventors: Jose Torres, Houston, TX (US); Jose Torres, Jr., Houston, TX (US)

(*) Notice: Subject to any disclaimer, the term of this patent is extended or adjusted under 35 U.S.C. 154(b) by 176 days.

(21) Appl. No.: 16/922,637

(22) Filed: Jul. 7, 2020

(65) Prior Publication Data

US 2022/0009410 A1  Jan. 13, 2022

(51) Int. Cl.
*B60Q 1/50* (2006.01)
*B60Q 1/26* (2006.01)
*E01F 9/662* (2016.01)
*B60R 21/00* (2006.01)

(52) U.S. Cl.
CPC .............. *B60Q 1/50* (2013.01); *B60Q 1/2692* (2013.01); *E01F 9/662* (2016.02); *B60Q 1/2657* (2013.01); *B60R 2021/0067* (2013.01)

(58) Field of Classification Search
CPC ...... B60Q 1/50; B60Q 1/2692; B60Q 1/2657; E01F 9/662; B60R 2021/0067
See application file for complete search history.

(56) References Cited

U.S. PATENT DOCUMENTS

| | | | |
|---|---|---|---|
| 4,766,413 A * | 8/1988 | Reavell | B60Q 1/50 180/289 |
| 5,038,136 A | 8/1991 | Watson | |
| 5,510,764 A | 4/1996 | Hauptli | |
| 5,564,359 A * | 10/1996 | Harder | B60R 21/34 116/28 R |
| 5,847,642 A | 12/1998 | Esposito | |
| 6,213,047 B1 | 4/2001 | Means | |
| 6,738,089 B1 * | 5/2004 | Silc | G07C 5/0891 348/148 |
| 7,633,382 B2 * | 12/2009 | Bowler | B60Q 1/50 348/148 |
| 8,599,260 B1 | 12/2013 | Vaughn | |
| 2003/0070603 A1 | 4/2003 | VanderMolen | |
| 2004/0148057 A1 * | 7/2004 | Breed | G01S 7/4802 700/242 |
| 2008/0157945 A1 * | 7/2008 | Bowler | B60Q 1/0023 348/148 |
| 2009/0273941 A1 * | 11/2009 | Englander | B60Q 1/50 362/494 |
| 2012/0177336 A1 * | 7/2012 | Bhan | H04N 7/183 348/148 |
| 2014/0098231 A1 | 4/2014 | Buley | |

(Continued)

*Primary Examiner* — Joseph H Feild
*Assistant Examiner* — Rufus C Point (57) ABSTRACT

A school bus stop sign assembly for enhancing safety of children entering and exiting a school bus includes a hinging unit that is coupled to an outer wall of a school bus. The hinging unit is actuated into a deployed position and a stored position. A member is coupled to the hinging unit and the member extends outwardly from the school bus when the hinging unit is actuated into the deployed position. Thus, the member extends across a roadway on which the school bus is driving to inhibit a vehicle from passing the school bus thereby enhancing safety for children entering or exiting the school bus. A pair of video cameras is each coupled to the member to capture imagery of the environment around the member.

10 Claims, 7 Drawing Sheets

(56) References Cited

U.S. PATENT DOCUMENTS

| | | | |
|---|---|---|---|
| 2015/0158419 A1* | 6/2015 | Buley | B60Q 1/2692 |
| | | | 362/478 |
| 2018/0354413 A1* | 12/2018 | Maiorana | B60Q 1/486 |
| 2018/0354414 A1* | 12/2018 | Maiorana | G08G 1/168 |
| 2019/0366962 A1* | 12/2019 | Moss | B60Q 1/50 |
| 2020/0130569 A1* | 4/2020 | Lindsey | B60Q 1/2692 |

* cited by examiner

SCHOOL BUS STOP SIGN ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to stop sign devices and more particularly pertains to a new stop sign device for enhancing safety for children entering or exiting a school bus.

(2) Description of Related Art Including Information Disclosed Under 37 CFR 1.97 and 1.98

The prior art relates to stop sign devices including a school bus stop sign device that has a rotatable stop sign mounted on a pole. The prior art discloses a sensor mounted on a school bus for detecting when a vehicle attempts to pass the school bus when a stop sign is deployed. The prior art discloses a member that is hingedly coupled to a school bus for substantially blocking a lane of traffic when children are entering or exiting the school bus. The prior art discloses a member, comprising a plurality of telescopic sections, that is hingedly coupled to a school bus. Additionally, the prior art discloses a video surveillance device that is mounted on a school bus for recording footage of vehicles that attempt to pass the school bus when children are entering or exiting the school bus.

BRIEF SUMMARY OF THE INVENTION

An embodiment of the disclosure meets the needs presented above by generally comprising a hinging unit that is coupled to an outer wall of a school bus. The hinging unit is actuated into a deployed position and a stored position. A member is coupled to the hinging unit and the member extends outwardly from the school bus when the hinging unit is actuated into the deployed position. Thus, the member extends across a roadway on which the school bus is driving to inhibit a vehicle from passing the school bus thereby enhancing safety for children entering or exiting the school bus. A pair of video cameras is each coupled to the member to capture imagery of the environment around the member.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new stop sign device embodying the principles and concepts of an embodiment of the disclosure and generally designated by the reference numeral 10 will be described.

As best illustrated in FIGS. 1 through 7, the school bus stop sign assembly 10 generally comprises a hinging unit 12 that is coupled to an outer wall 14 of a school bus 16. The hinging unit 12 is actuated into a deployed position and a stored position. The hinging unit 12 comprises an actuator 18 that is coupled to the outer wall 14 of the school bus 16. The actuator 18 is electrically coupled to a power source 20 comprising an electrical system of the school bus 16 and the actuator 18 is in communication with a switch 22 in the school bus 16. The switch 22 comprises the switch that is currently employed for controlling existing stop signs on school buses. The actuator 18 rotates in a first direction when the switch 22 is turned on and the actuator 18 rotates in a second direction when the switch 22 is turned off. The actuator 18 may comprise an electric motor or the like that rotates a predetermined degree of rotation when the electric motor is turned on and off.

The hinging unit 12 includes a yoke 24 that has a central member 26 extending between a pair of outward members 28. Each of the outward members 28 has a distal end 30 with respect to the central member 26 and the distal end 30 of each of the outward members 28 is coupled to the actuator 18. The yoke 24 is oriented to extend along a line that is oriented perpendicular to the outer wall 14 of the school bus 16 when the actuator 18 rotates in the first direction. Conversely, the yoke 24 is oriented to extend along a line that is oriented parallel to the outer wall 14 of the school bus 16 when the actuator 18 rotates in the second direction.

A member 32 is provided and the member 32 is coupled to the hinging unit 12. The member 32 extends outwardly from the school bus 16 when the hinging unit 12 is actuated into the deployed position. The member 32 extends across a roadway on which the school bus 16 is driving when the hinging unit 12 is actuated into the deployed position. In this way the member 32 inhibits a vehicle from passing the school bus 16 thereby enhancing safety for children entering or exiting the school bus 16. Moreover, the member 32 has a length of at least 10.0 feet thereby facilitating the member 32 to extend substantially across the width of the roadway.

The member 32 has a first end 34, a second end 36, a front surface 38 and a back surface 40. The first end 34 is coupled to the central member 26 of the yoke 24 and the front surface 38 has indicia 42 printed thereon. The indicia 42 comprise an alternating sequence of stripes that are distributed between the first end 34 and the second end 36. In this way the indicia 42 enhance visibility of the member 32. The back surface 40 has indicia 44 printed thereon and the indicia 44 on the back surface 40 comprise an alternating sequence of stripes that are distributed between the first end 34 and the second end 36. In this way the indicia 44 on the back surface 40 enhance visibility of the member 32.

A stop sign 46 is integrated into the member 32 and the stop sign 46 communicates a stop command to traffic on the roadway when the member 32 extends across the roadway. The stop sign 46 is centrally positioned between the first end 34 and the second end 36 of the member 32. The stop sign 46 has a front side 48 and a back side 50, and the front side 48 lies on a plane that is coplanar with the front surface 38 of the member 32. The back side 50 lies on a plane that is coplanar with the back surface 40 of the member 32.

A plurality of light emitters 52 is each coupled to the member 32 to emit light outwardly therefrom. The plurality of light emitters 52 is distributed along a full length of each of the front surface 38 and the back surface 40 of the member 32. Each of the light emitters 52 is electrically coupled to the switch 22 in the school bus 16. Moreover, each of the light emitters 52 is turned on when the switch 22 is turned on such that each of the light emitters 52 visually alerts traffic to come to a stop. Each of the light emitters 52 may comprise an LED or other similar type of light emitter.

A pair of video cameras 54 is each coupled to the member 32 and each of the video cameras 54 captures imagery of the environment around the member 32. Each of the video cameras 54 is turned on when the hinging unit 12 is actuated into the deployed position. In this way each of the video cameras 54 captures imagery of the traffic proximate the school bus 16 when the children are entering or exiting the school bus 16. Each of the video cameras 54 is positioned on a respective one of the front surface 38 and the back surface 40 of the member 32.

Each of the video cameras 54 is electrically coupled to the power source 20 comprising the electrical system of the school bus 16. Additionally, each of the video cameras 54 is in electrical communication with the switch 22 and each of the video cameras 54 is turned on when the switch 22 is turned on. Each of the video cameras 54 comprises a housing 56 is coupled to the member 32 and a lens 58 is coupled to the housing 56. Moreover, each of the video cameras 54 may comprise a digital video camera and each of the video cameras 54 is in communication with a remote storage device 60 for storing video footage captured by the video cameras 54.

Figure 1:
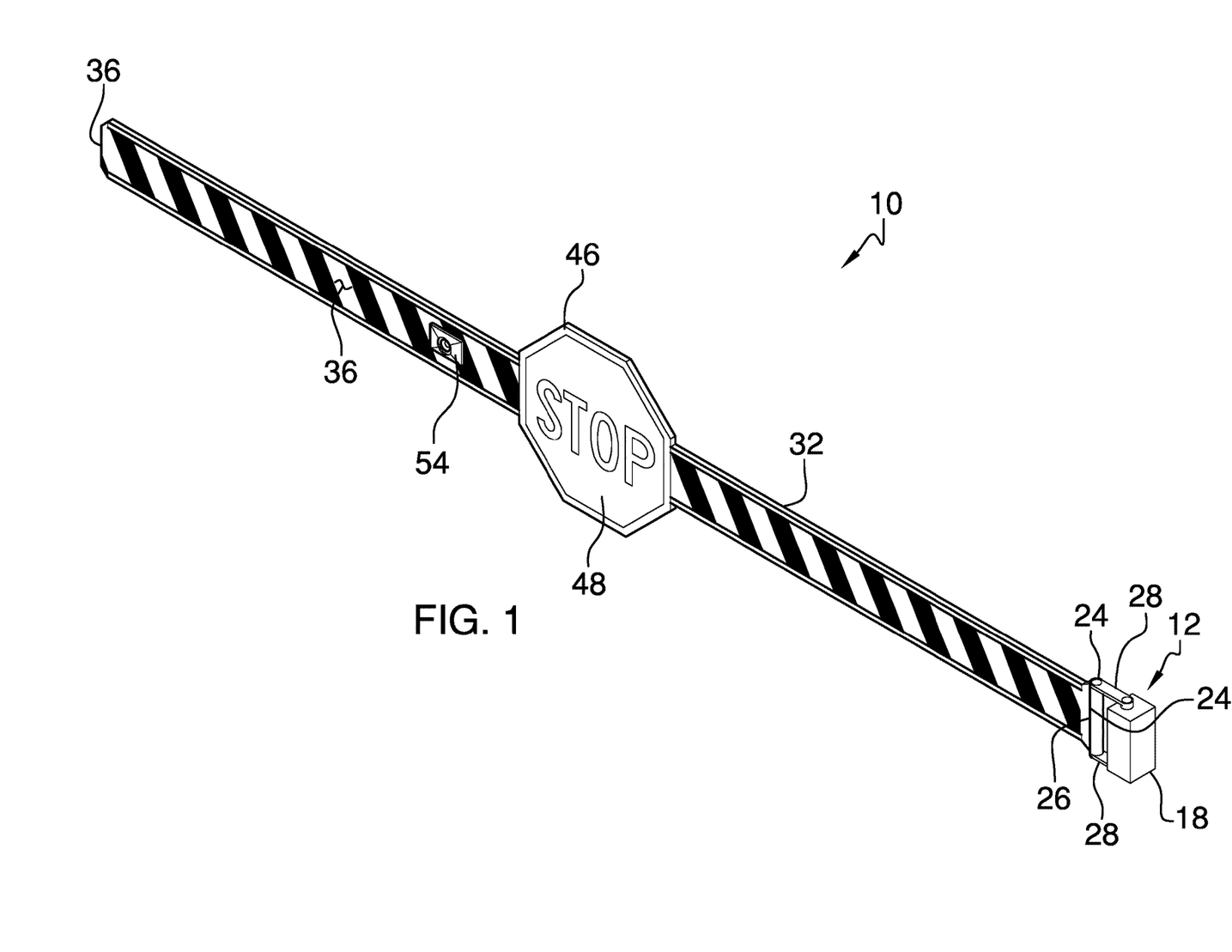
FIG. 1 is a perspective view of a school bus stop sign assembly according to an embodiment of the disclosure.
Figure 2:
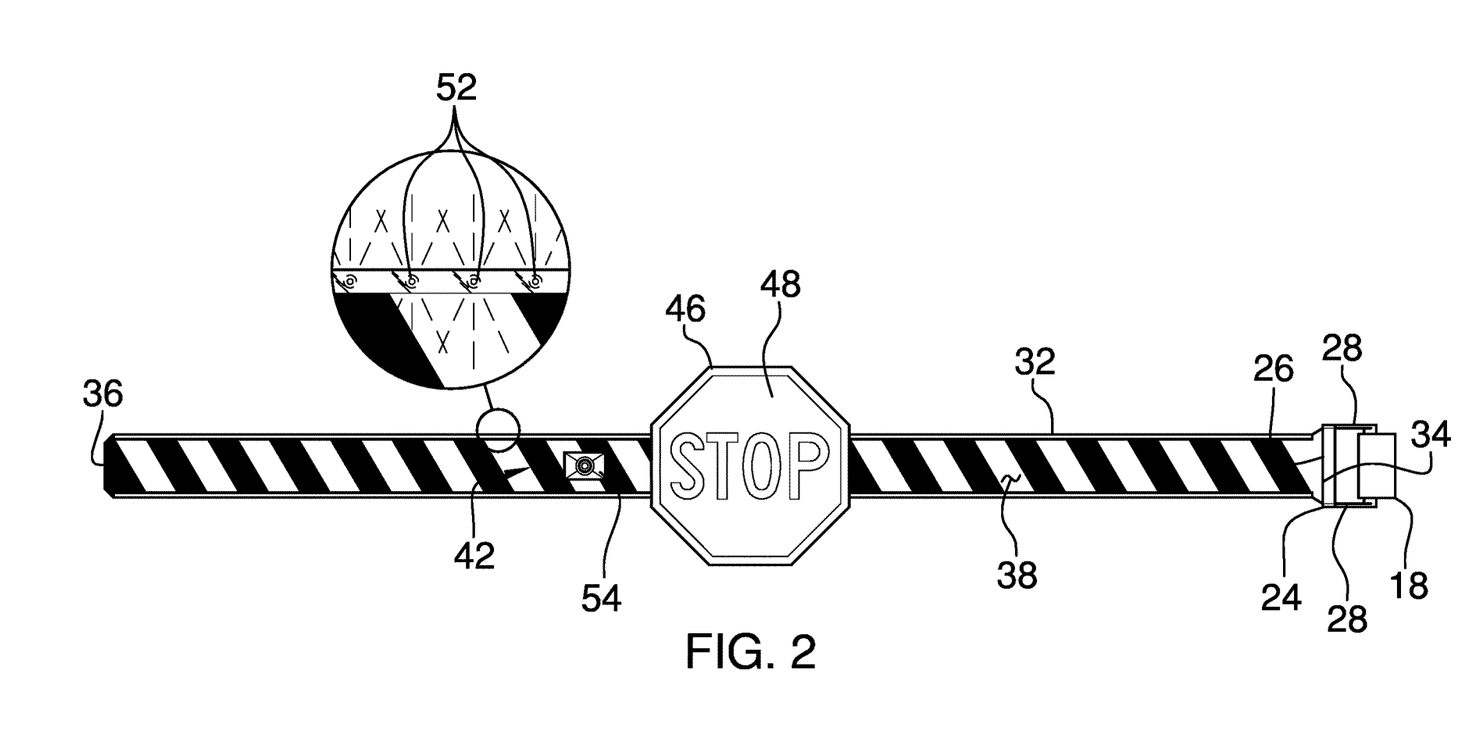
FIG. 2 is a front view of an embodiment of the disclosure.
Figure 3:
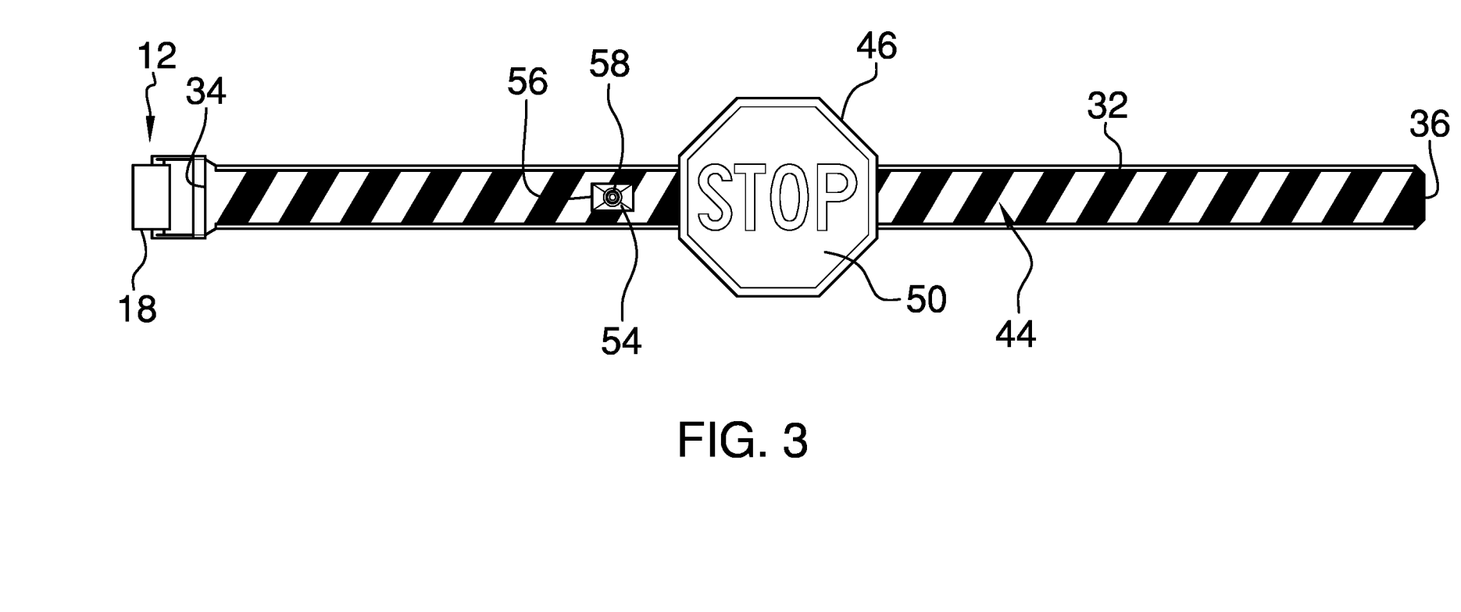
FIG. 3 is a back view of an embodiment of the disclosure.
Figure 4:
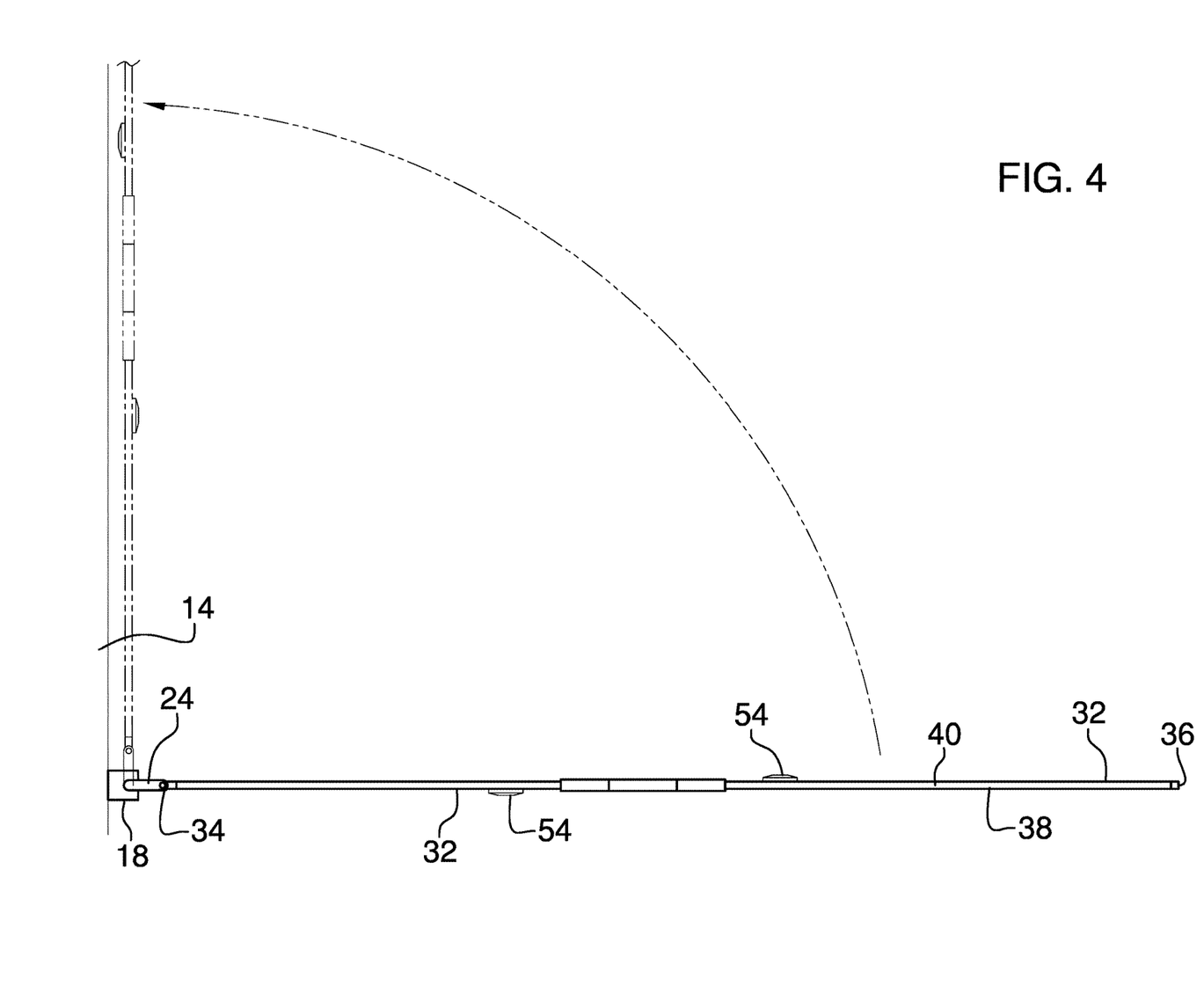
FIG. 4 is a top view of an embodiment of the disclosure.
Figure 5:
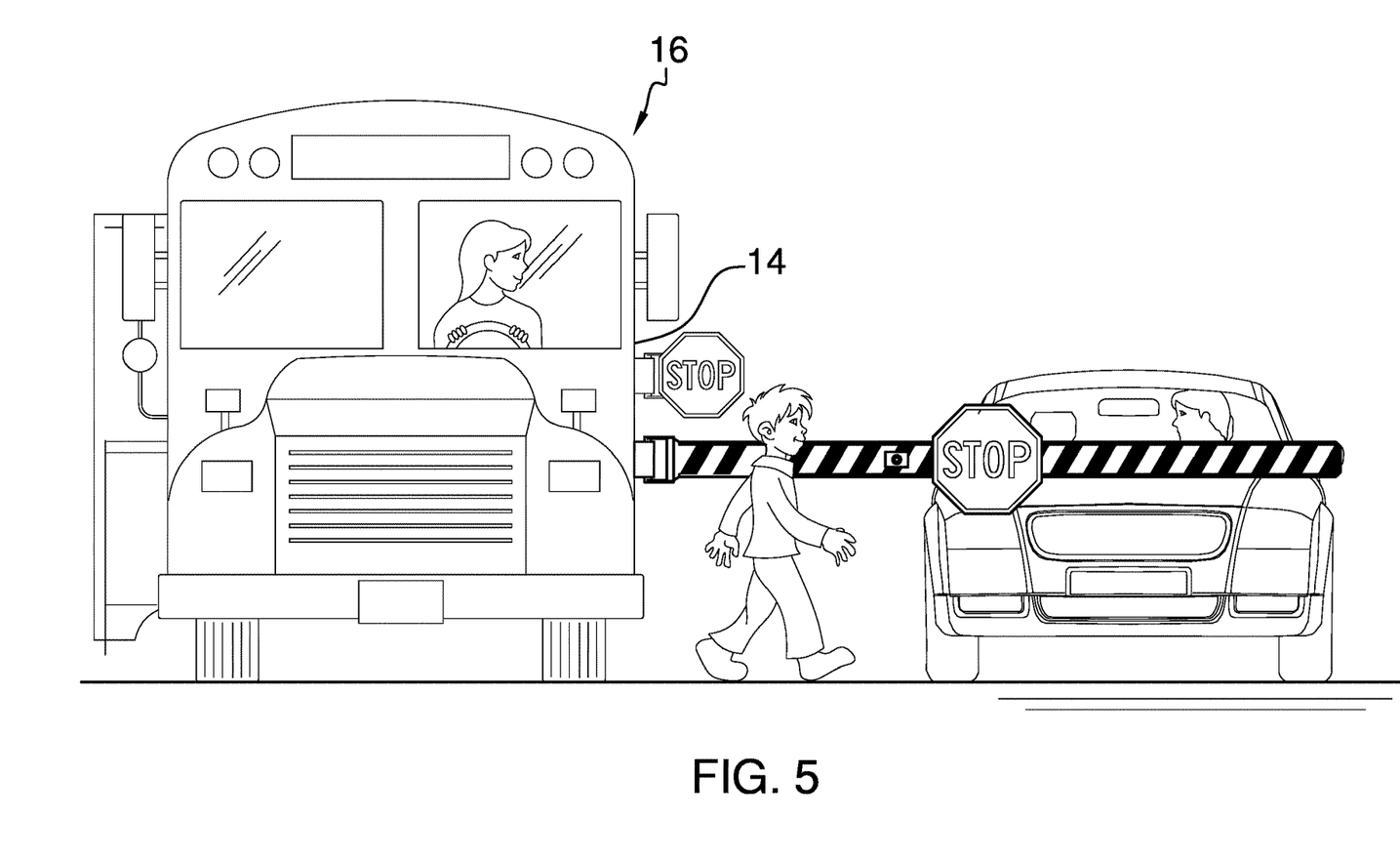
FIG. 5 is a perspective in-use view of an embodiment of the disclosure.
Figure 6:
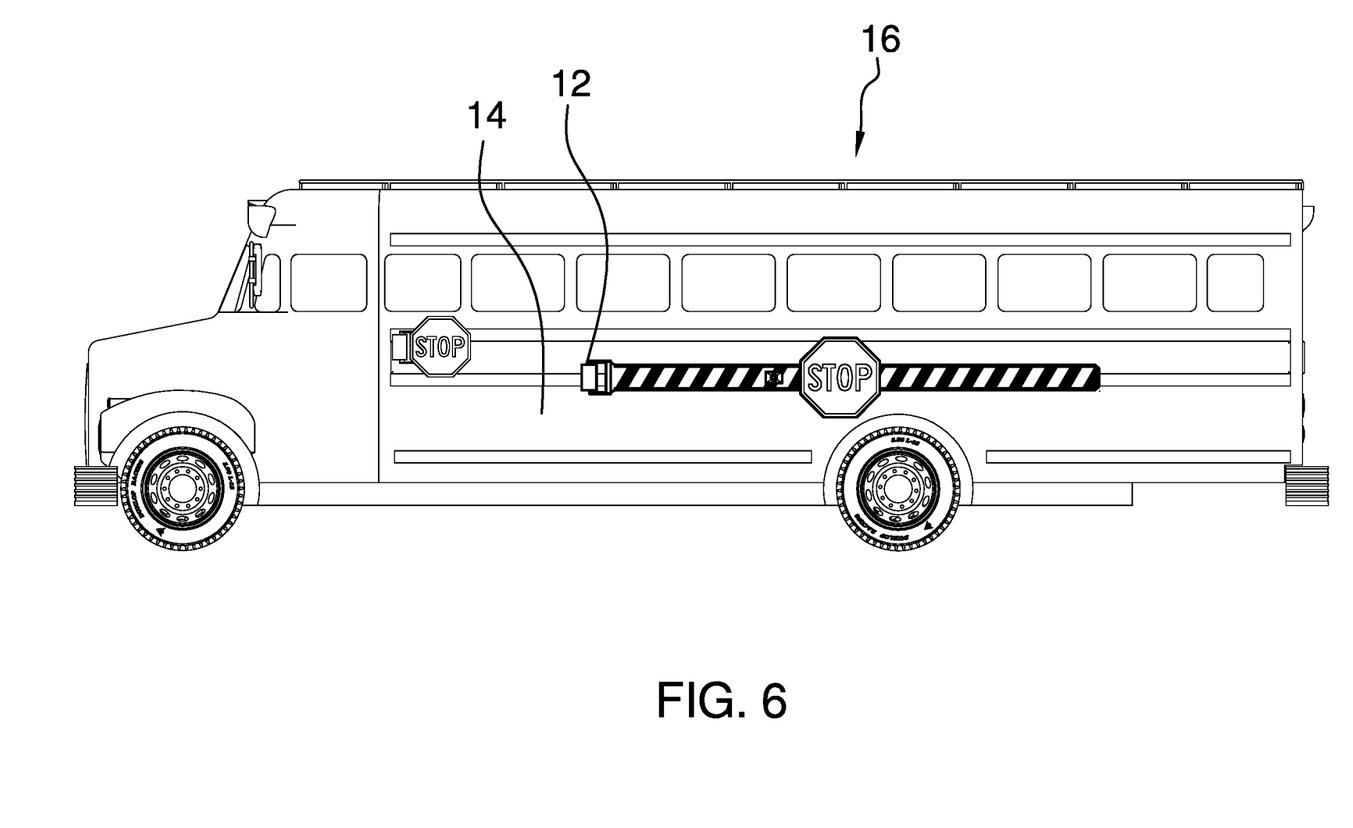
FIG. 6 is a left side in-use view of an embodiment of the disclosure.
Figure 7:
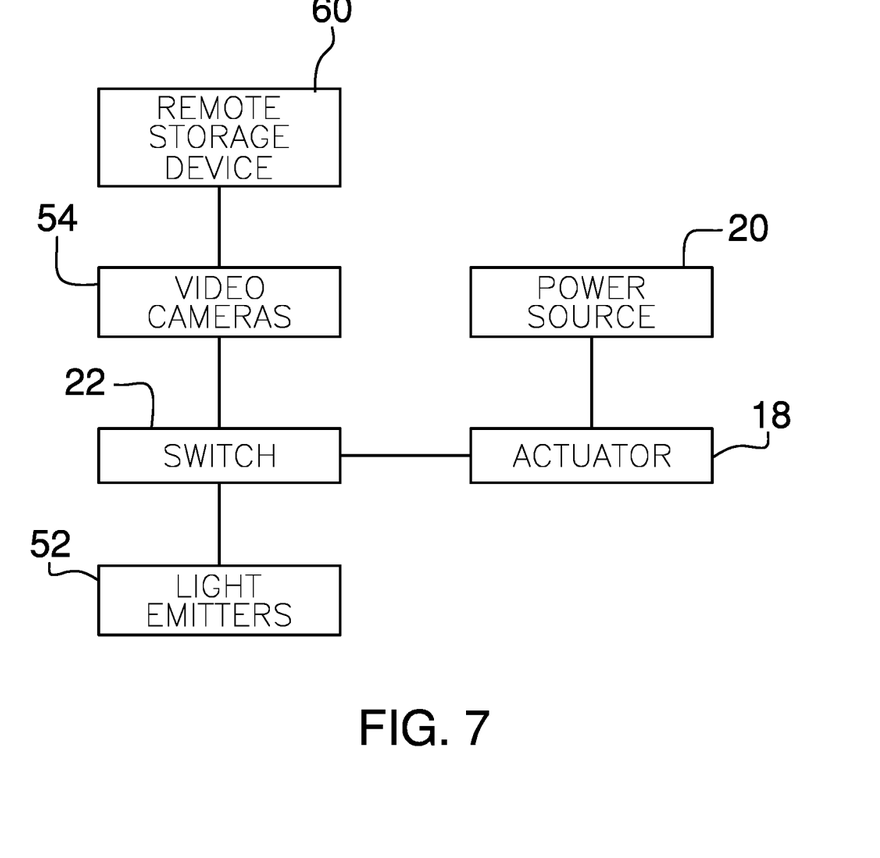
FIG. 7 is a schematic view of an embodiment of the disclosure.

In use, the school bus 16 driver turns the switch 22 on to deploy the member 32. The actuator 18 urges the member 32 to extend outwardly from the school bus 16 and across the roadway. In this way traffic is inhibited from passing the school bus 16 when the children are exiting or entering the school bus 16. Additionally, each of the light emitters 52 is turned on and each of the video cameras 54 is turned on. The light emitters 52 enhance visibility of the member 32 and the video cameras 54 capture imagery of vehicles adjacent to the school bus 16 for subsequent examination by law enforcement if a vehicle attempts to drive around the member 32.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A school bus stop sign assembly for inhibiting traffic from passing a school bus when children are entering or exiting the school bus, said assembly comprising:
   a hinging unit being coupled to an outer wall of a school bus, said hinging unit being actuated into a deployed position and a stored position;
   a member having a fixed length, said member being coupled to said hinging unit, said member extending outwardly from the school bus when said hinging unit is actuated into said deployed position having said member extending across a roadway on which the school bus is driving wherein said member is configured to inhibit a vehicle from passing the school bus thereby enhancing safety for children entering or exiting the school bus;
   a stop sign being integrated into said member wherein said stop sign is configured to communicate a stop command to traffic on the roadway when said member extends across the roadway;
   a plurality of light emitters, each of said light emitters being coupled to said member wherein each of said light emitters is configured to emit light outwardly therefrom; and
   a pair of video cameras, each of said video cameras being coupled to said member wherein each of said video cameras is configured to capture imagery of the environment around said member, each of said video cameras being turned on when said hinging unit is actuated into said deployed position wherein each of said video cameras is configured to capture imagery of the traffic proximate the school bus when the children are entering or exiting the school bus, wherein each of said video cameras is positioned on a respective one of said front surface and said back surface of said member such that one of the pair of video cameras is directed forwardly when the member is fully extended and another of the pair of video cameras is directed rearwardly when the member is fully extended, the one of the pair of video cameras directed rearwardly being positioned farther from the outer wall of the school bus than the one of the pair of video cameras directed forwardly.

2. The assembly according to claim 1, wherein said hinging unit comprises an actuator being coupled to the outer wall of the school bus, said actuator being electrically coupled to a power source comprising an electrical system of the school bus, said actuator being in communication with a switch in the school bus, said actuator rotating in a first direction when the switch is turned on, said actuator rotating in a second direction when the switch is turned off.

3. The assembly according to claim 2, further comprising a yoke having a central member extending between a pair of outward members, each of said outward members having a distal end with respect to said central member, said distal end of each of said outward members being coupled to said actuator, said yoke being oriented to extend along a line being oriented perpendicular to the outer wall of the school bus when said actuator rotates in said first direction, said yoke being oriented to extend along a line being oriented parallel to the outer wall of the school bus when said actuator rotates in said second direction.

4. The assembly according to claim 1, wherein said member has a length of at least 10.0 feet wherein said member is configured to extend substantially across the width of the roadway.

5. The assembly according to claim 3, wherein said member has a first end, a second end, a front surface and a back surface, said first end being coupled to said central member of said yoke.

6. The assembly according to claim 5, wherein said front surface has indicia being printed thereon, said indicia comprising an alternating sequence of stripes being distributed between said first end and said second end wherein said indicia are configured to enhance visibility of said member, said back surface having indicia being printed thereon, said indicia on said back surface comprising an alternating sequence of stripes being distributed between said first end and said second end wherein said indicia on said back surface are configured to enhance visibility of said member.

7. The assembly according to claim 5, wherein said stop sign is centrally positioned between said first end and said second end of said member, said stop sign having a front side and a back side, said front side lying on a plane being coplanar with said front surface of said member, said back side lying on a plane being coplanar with said back surface of said member.

8. The assembly according to claim 5, wherein said plurality of light emitters is distributed along a full length of each of said front surface and said back surface of said member, each of said light emitters being electrically coupled to the switch in the school bus, each of said light emitters being turned on when the switch is turned on wherein each of said light emitters is configured to visually alert traffic to come to a stop.

9. The assembly according to claim 5, each of said video cameras being electrically coupled to the power source comprising the electrical system of the school bus, each of said video cameras being in electrical communication with the switch, each of said video cameras being turned on when the switch is turned on, each of said video cameras comprising a housing being coupled to said member and a lens being coupled to said housing.

10. A school bus stop sign assembly for inhibiting traffic from passing a school bus when children are entering or exiting the school bus, said assembly comprising:
  a hinging unit being coupled to an outer wall of a school bus, said hinging unit being actuated into a deployed position and a stored position, said hinging unit comprising:
    an actuator being coupled to the outer wall of the school bus, said actuator being electrically coupled to a power source comprising an electrical system of the school bus, said actuator being in communication with a switch in the school bus, said actuator rotating in a first direction when the switch is turned on, said actuator rotating in a second direction when the switch is turned off; and
    a yoke having a central member extending between a pair of outward members, each of said outward members having a distal end with respect to said central member, said distal end of each of said outward members being coupled to said actuator, said yoke being oriented to extend along a line being oriented perpendicular to the outer wall of the school bus when said actuator rotates in said first direction, said yoke being oriented to extend along a line being oriented parallel to the outer wall of the school bus when said actuator rotates in said second direction;
  a member having a fixed length, said member being coupled to said hinging unit, said member extending outwardly from the school bus when said hinging unit is actuated into said deployed position having said member extending across a roadway on which the school bus is driving wherein said member is configured to inhibit a vehicle from passing the school bus thereby enhancing safety for children entering or exiting the school bus, said member having a length of at least 10.0 feet wherein said member is configured to extend substantially across the width of the roadway, said member having a first end, a second end, a front surface and a back surface, said first end being coupled to said central member of said yoke, said front surface having indicia being printed thereon, said indicia comprising an alternating sequence of stripes being distributed between said first end and said second end wherein said indicia are configured to enhance visibility of said member, said back surface having indicia being printed thereon, said indicia on said back surface comprising an alternating sequence of stripes being distributed between said first end and said second end wherein said indicia on said back surface are configured to enhance visibility of said member;
  a stop sign being integrated into said member wherein said stop sign is configured to communicate a stop command to traffic on the roadway when said member extends across the roadway, said stop sign being centrally positioned between said first end and said second end of said member, said stop sign having a front side and a back side, said front side lying on a plane being coplanar with said front surface of said member, said back side lying on a plane being coplanar with said back surface of said member;

a plurality of light emitters, each of said light emitters being coupled to said member wherein each of said light emitters is configured to emit light outwardly therefrom, said plurality of light emitters being distributed along a full length of each of said front surface and said back surface of said member, each of said light emitters being electrically coupled to the switch in the school bus, each of said light emitters being turned on when the switch is turned on wherein each of said light emitters is configured to visually alert traffic to come to a stop; and a pair of video cameras, each of said video cameras being coupled to said member wherein each of said video cameras is configured to capture imagery of the environment around said member, each of said video cameras being turned on when said hinging unit is actuated into said deployed position wherein each of said video cameras is configured to capture imagery of the traffic proximate the school bus when the children are entering or exiting the school bus, each of said video cameras being positioned on a respective one of said front surface and said back surface of said member such that one of the pair of video cameras is directed forwardly when the member is fully extended and another of the pair of video cameras is directed rearwardly when the member is fully extended, the one of the pair of video cameras directed rearwardly being positioned farther from the outer wall of the school bus than the one of the pair of video cameras directed forwardly, each of said video cameras being electrically coupled to the power source comprising the electrical system of the school bus, each of said video cameras being in electrical communication with the switch, each of said video cameras being turned on when the switch is turned on, each of said video cameras comprising a housing being coupled to said member and a lens being coupled to said housing.

* * * * *